United States Patent
Głowa et al.

(10) Patent No.: US 11,921,621 B2
(45) Date of Patent: Mar. 5, 2024

(54) SYSTEM AND METHOD FOR IMPROVED UNIT TEST CREATION

(71) Applicant: PARASOFT CORPORATION, Monrovia, CA (US)

(72) Inventors: Maciej Głowa, Cracow (PL); Nathan Michael Jakubiak, Pasadena, CA (US); Michał Rozenau, Slupsk (PL); Marcin Strojny, Cracow (PL); Piotr Grzesik, Cracow (PL); Michał Kusmierczyk, Cracow (PL)

(73) Assignee: PARASOFT CORPORATION, Monrovia, CA (US)

( * ) Notice: Subject to any disclaimer, the term of this patent is extended or adjusted under 35 U.S.C. 154(b) by 213 days.

(21) Appl. No.: 17/459,240

(22) Filed: Aug. 27, 2021

(65) Prior Publication Data
US 2022/0075710 A1  Mar. 10, 2022

Related U.S. Application Data

(60) Provisional application No. 63/076,283, filed on Sep. 9, 2020.

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC .......................... G06F 11/36–3696; G06F 8/75
See application file for complete search history.

(56) References Cited

U.S. PATENT DOCUMENTS

| | | | | |
|---|---|---|---|---|
| 7,665,072 B2 * | 2/2010 | Tillman | ............... | G06F 11/3684 717/133 |
| 8,024,705 B2 * | 9/2011 | Hughes | ............... | G06F 11/3688 717/124 |
| 2005/0114737 A1 * | 5/2005 | Hughes | ............... | G06F 11/3688 714/38.1 |
| 2006/0242466 A1 * | 10/2006 | Tillmann | ............ | G06F 11/3684 714/38.1 |

* cited by examiner

*Primary Examiner* — Todd Aguilera
(74) *Attorney, Agent, or Firm* — LEWIS ROCA ROTHGERBER CHRISTIE LLP

(57) ABSTRACT

System and method for creating unit tests include: constructing a CFG representation for a computer program; utilizing the CFG to identify different potential execution paths and to identify different formulas corresponding to the different potential execution paths; parsing the source code to generate an abstract syntax tree; analyzing the computer program to determine whether it provides capability to set each of the associated variables in each formula by utilizing the abstract syntax tree; translating variables, fields, and expressions of the source code represented in each formula into decision variables; computing a solution to the list of pre-conditions from each formula to one of the potential solutions that specifies values for decision variables; selecting a formula, from the plurality of formulas, with a fewest number of associated variables; and creating a unit test, based on the data and the list of pre-conditions collected and solved.

18 Claims, 9 Drawing Sheets

FIG. 1

```
4   public class Account
5   {
6       private final String _customer;
7       private final boolean _student;
8       private int _balance = 0;
9       private final int GOLD_BALANCE_LIMIT = 500;
10
11      public Account(String customer, int balance)
12      {
13          this(customer, balance, false);
14      }
15
16      public Account(String customer, int balance, boolean student)
17      {
18          if (customer == null) {
19              throw new IllegalArgumentException("Invalid customer: " + customer);
20          }
21          if (balance < 0) {
22              throw new IllegalArgumentException("Invalid initial balance: " + balance);
23          }
24          _customer = customer;
25          _student = student;
26          _balance = balance;
27      }
28
29      public String getCustomer()
30      {
31          return _customer;
32      }
33
34      public int apply(ITransaction transaction)
35      {
36          System.out.println("Processing transaction on " + _customer + " account ...");
37          if (transaction.apply(this)) {
38              System.out.println("Transaction has been completed.");
39              if (!_student && (_balance < GOLD_BALANCE_LIMIT)) {
40                  System.out.println("Transaction fee has been charged.");
41                  _balance -= transaction.fee();
42              }
43          } else {
44              System.out.println("Transaction has not been completed.");
45          }
46          return _balance;
```

FIG. 1 (Continued)

```
47   }
48 } public interface ITransaction
{
   /** Performs the transaction. */
   boolean apply(Account account);

/** Transaction fee, must be greater or equal to zero. */
   int fee();
}
```

FIG. 4

```
PACKAGE
    PackageDeclaration [1+13]
IMPORTS (0)
TYPES (1)
    TypeDeclaration [16+1341]
        > type binding: bank.Account
        JAVADOC: null
        MODIFIERS (1)
        INTERFACE: 'false'
        NAME
        TYPE_PARAMETERS (0)
        SUPERCLASS_TYPE: null
        SUPER_INTERFACE_TYPES (0)
        BODY_DECLARATIONS (8)
            FieldDeclaration [43+31]
            FieldDeclaration [79+31]
            FieldDeclaration                              ← 401
                JAVADOC: null
                MODIFIERS (1)
                    Modifier [115+7]
                        KEYWORD: 'private'                ← 402
                TYPE
                    PrimitiveType [123+3]
                        > type binding: int
                        ANNOTATIONS (0)
                        PRIMITIVE_TYPE_CODE: 'int'
                FRAGMENTS (1)
                    VariableDeclarationFragment [127+12]
                        > variable binding: Account._balance
                        NAME
                        EXTRA_DIMENSIONS2 (0)
                        INITIALIZER
            FieldDeclaration [145+43]
```

FIG. 4 (Continued)

MethodDeclaration [194+96]
MethodDeclaration [296+406]  ← 403
    > method binding: Account.Account(String, int, boolean)
        NAME: "Account"
        KEY: "Lbank/Account;.(Ljava/lang/String;IZ)V"
        IS RECOVERED: false
        IS CONSTRUCTOR: true
        IS DEFAULT CONSTRUCTOR: false
        DECLARING CLASS: bank.Account
        RETURN TYPE: void
        MODIFIERS: 0x1 (public)
        PARAMETER TYPES (3)
            0: java.lang.String
            1: int
            2: boolean
        IS VARARGS: false
        EXCEPTION TYPES (0)
        GENERICS:
        METHOD DECLARATION ( == this): Account.Account(String, int, boolean)
        TYPE PARAMETERS (0)
        TYPE ARGUMENTS (0)
        IS SYNTHETIC: false
        IS DEPRECATED: false
        IS ANNOTATION MEMBER: false
        DEFAULT VALUE: null
        PARAMETER ANNOTATIONS (3)
        ANNOTATIONS (0)
    > ResolvedSourceMethod: bank.Account.Account(String, int, boolean)
    JAVADOC: null
    MODIFIERS (1)
    CONSTRUCTOR: 'true'
    TYPE_PARAMETERS (0)
    RETURN_TYPE2: null
    NAME
    RECEIVER_TYPE: null
    RECEIVER_QUALIFIER: null

FIG. 4 (Continued)

```
PARAMETERS (3)
   SingleVariableDeclaration [311+15]
   SingleVariableDeclaration [328+11]
      > variable binding: balance
      MODIFIERS (0)
      TYPE
      VARARGS_ANNOTATIONS (0)
      VARARGS: 'false'
      NAME
         SimpleName [332+7]
            > (Expression) type binding: int
            > variable binding: balance
            Boxing: false; Unboxing: false
            ConstantExpressionValue: null
            IDENTIFIER: 'balance'
            VAR: 'false'
      EXTRA_DIMENSIONS2 (0)
      INITIALIZER: null
   SingleVariableDeclaration [341+15]
EXTRA_DIMENSIONS2 (0)
THROWN_EXCEPTION_TYPES (0)
```

FIG. 4 (Continued)

```
        BODY
          Block [362+340]
            STATEMENTS (5)
              IfStatement [372+114]
              IfStatement [495+115]
              ExpressionStatement [619+21]
              ExpressionStatement [649+19]
              ExpressionStatement [677+19]
                EXPRESSION
                  Assignment [677+18]                    ← 404
                    > (Expression) type binding: int
                    Boxing: false; Unboxing: false
                    ConstantExpressionValue: null
                    LEFT_HAND_SIDE                       ← 405
                      SimpleName [677+8]
                        > (Expression) type binding: int
                        > variable binding: Account._balance
                        Boxing: false; Unboxing: false
                        ConstantExpressionValue: null
                        IDENTIFIER: '_balance'
                        VAR: 'false'
                    OPERATOR: '='
                    RIGHT_HAND_SIDE                      ← 406
                      SimpleName [688+7]
                        > (Expression) type binding: int
                        > variable binding: balance
                        Boxing: false; Unboxing: false
                        ConstantExpressionValue: null
                        IDENTIFIER: 'balance'
                        VAR: 'false'
        MethodDeclaration [712+65]
        MethodDeclaration [787+568]
MODULE: null
> CompilationUnit: bank.Account.java
> comments (0)
> compiler problems (0)
> AST settings
> RESOLVE_WELL_KNOWN_TYPES
```

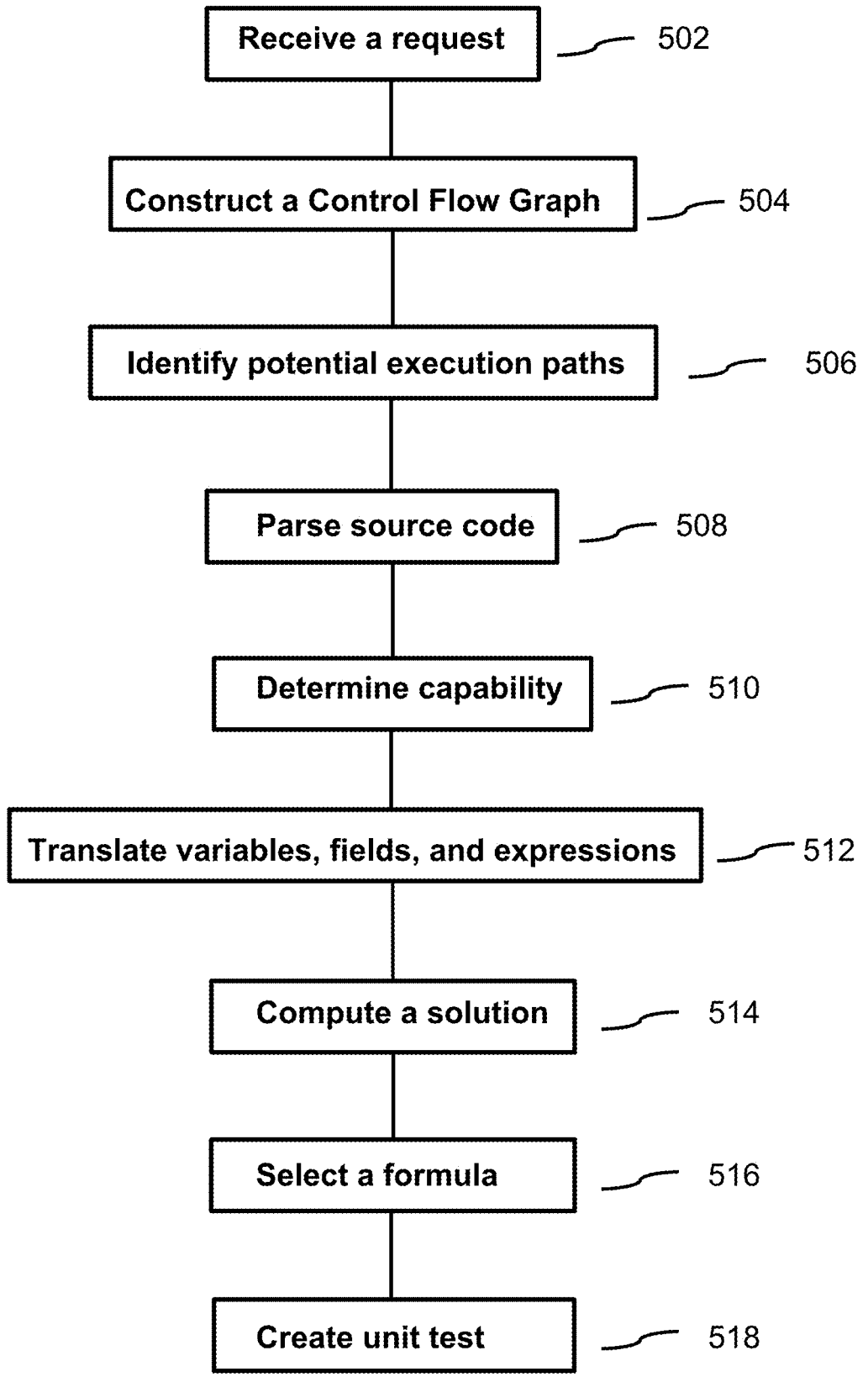

SYSTEM AND METHOD FOR IMPROVED UNIT TEST CREATION

CROSS-REFERENCE TO RELATED APPLICATIONS

This Patent Applications claims the benefits of U.S. Provisional Patent Application Ser. No. 63/076,283, filed on Sep. 9, 2020, and entitled "System and Method for Improved Unit Test Creation," the entire content of which is hereby expressly incorporated by reference.

FIELD OF THE INVENTION

The disclosed invention relates generally to software testing and more particularly to a system and method for improved unit test creation.

BACKGROUND

Manually creating unit tests is a complex and time-consuming process. This is especially true when writing tests for legacy code inherited from older versions of a software application, because the developers writing the tests for that code are often unfamiliar with the legacy code. The time the developers need to take to understand the logic and flow in the classes for which they are writing tests adds overhead to the unit testing process. Moreover, a developer who manually writes test code often needs to make many decisions while writing test code that could execute a complex scenario that contains several steps and verifies data. A unit testing solution that can automatically create and set up unit tests must follow a similar process in order to create readable, stable, and maintainable unit tests.

Most IT organizations understand the benefits of detecting code defects early in the Software Development Life Cycle (SDLC) and recognize the need to unit test their code. They are also aware, however, that the cost of manually creating unit tests has an impact on their ability to deliver their products or services in their desired timeframes. For this reason, organizations are looking for solutions to speed up the unit testing process by automatically creating valuable unit tests for any production code.

A number of companies are trying to address this market demand with limited success. Some solutions enable developers to automatically create unit test templates (skeletons) that need to be manually completed with relevant data. This approach still requires significant time and effort since the core logic still needs to be written by the developer. Other solutions implement a more advanced model that attempts to predict the test's pre-conditions and post-conditions. However, the generated tests have high levels of code complexity. As a result, developers struggle to understand the tests, which becomes a barrier to long-term test maintenance.

Other solutions that are currently available on the market use one or more of the following approaches to collect the data required to set up a test:
  Regular and random values—randomly choosing values from a pre-defined set of acceptable values to construct all variables and pre-conditions.
  Static pre-analysis of tested code—parsing the tested code and analyzing the content to determine all variables and pre-conditions.
  Runtime post-analysis of executed test case—performing runtime analysis of the execution flow to determine the expected behavior that verifies the desired functionality.

Regardless of which approach or combination of approaches is applied, defining reliable test input data is challenging. Problems related to the accuracy and complexity of statically analyzing the parsed code, as well as the challenges surrounding runtime analysis of the executed flow, make it difficult to create a reliable solution for automated unit test creation.

Another challenge is creating the fewest possible number of unit tests to thoroughly cover the functionality, to reduce the amount of time needed to maintain the tests. Avoiding the need to create an excessive number of tests to cover the functionality requires a complex and advanced code analysis—which means that solutions based on random values are unable to satisfy this requirement.

SUMMARY

Present disclosure is directed to a method and a system for improved unit test creation. The method, executed by one or more processor, includes: receiving, over a computer network, an electronic request that specifies a portion in the computer program to be covered by the unit test; constructing a Control Flow Graph (CFG) representation for the portion in the computer program; utilizing the CFG to identify a plurality of different potential execution paths that may lead to the portion in the computer program and to identify a plurality of different formulas, corresponding to the plurality of different potential execution paths, wherein each formula includes a list of pre-conditions and associated variables that represent a simulated execution flow; parsing a source code of the portion in the computer program to generate an abstract syntax tree as representation of a content of the portion in the computer program; analyzing the portion in the computer program to determine whether it provides capability to set each of the associated variables in each formula, utilizing the abstract syntax tree; translating variables, fields, and expressions of the source code represented in each formula into a plurality of decision variables, using pre-determined categories of constraints; computing a solution to the list of pre-conditions from each formula to one of the potential solutions that specifies values for decision variables; selecting a formula, from the plurality of formulas, with a fewest number of associated variables, which has a solution that specifies values for decision variables for given pre-conditions; and creating a unit test, based on the data and the list of pre-conditions collected and solved.

In some embodiments, the disclosure is a system for creating unit tests for testing a computer program. The system includes: a flow analysis engine for constructing a Control Flow Graph (CFG) representation for the computer program; and utilizing the CFG to identify a plurality of different potential execution paths within the computer program and to identify a plurality of different formulas, corresponding to the plurality of different potential execution paths, wherein each formula includes a list of pre-conditions and associated variables that represent a simulated execution flow; a parser engine for parsing a source code of the computer program to generate an abstract syntax tree as representation of a content of the computer program; a test creation engine for analyzing the computer program to determine whether it provides capability to set each of the associated variables in each formula, utilizing the abstract syntax tree, wherein the test creation engine translates variables, fields, and expressions of the source code represented in each formula into a plurality of decision variables, using pre-determined categories of constraints; and a constraint programming library for computing a solution to the list of pre-conditions from the each formula to one of the potential solutions that specifies values for decision variables, wherein the test creation engine selects a formula, from the plurality of formulas, with a fewest number of associated variables, which has a solution that specifies values for decision variables for given pre-conditions, and creates a unit test, based on the data and the list of pre-conditions collected and solved.

In some embodiments, the disclosure is a tangible computer readable memory storing a plurality of computer instructions, the instructions when executed by one or more processor perform a method for creating unit tests for testing a computer program. The executed method includes: receiving, over a computer network, an electronic request that specifies a portion in the computer program to be covered by the unit test; constructing a Control Flow Graph (CFG) representation for the portion in the computer program; utilizing the CFG to identify a plurality of different potential execution paths that may lead to the portion in the computer program and to identify a plurality of different formulas, corresponding to the plurality of different potential execution paths, wherein each formula includes a list of pre-conditions and associated variables that represent a simulated execution flow; parsing a source code of the portion in the computer program to generate an abstract syntax tree as representation of a content of the portion in the computer program; analyzing the portion in the computer program to determine whether it provides capability to set each of the associated variables in each formula, utilizing the abstract syntax tree; translating variables, fields, and expressions of the source code represented in the each formula into a plurality of decision variables, using pre-determined categories of constraints; computing a solution to the list of pre-conditions from each formula to one of the potential solutions that specifies values for decision variables; selecting a formula, from the plurality of formulas, with a fewest number of associated variables, which has a solution that specifies values for decision variables for given pre-conditions; and creating a unit test, based on the data and the list of pre-conditions collected and solved.

The methods and system may verify characteristics for each variable used in the selected formula to determine whether the portion in the computer program provides capability to set each of the associated variables. The characteristics may include one or more of: whether the variable is an internal field of the class under test and can be configured as an input parameter passed to a constructor for the class, whether the variable is an internal field of the class under test and can be configured using an available setter method, whether the variable is an internal field of the class under test and can be configured because it is publicly accessible, and whether the variable can be configured as an input parameter to the tested portion.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIG. 1 shows an example of an Account class and an example ITransaction interface used by a method in that class.

FIG. 4 shows a partial abstract syntax tree generated for the example Account class by a parser, according to some embodiments of the disclosure.

FIG. 5 depicts an exemplary process flow for creation of unit tests to test a computer program, according to some embodiments of the disclosure.

DETAILED DESCRIPTION

Figure 2:
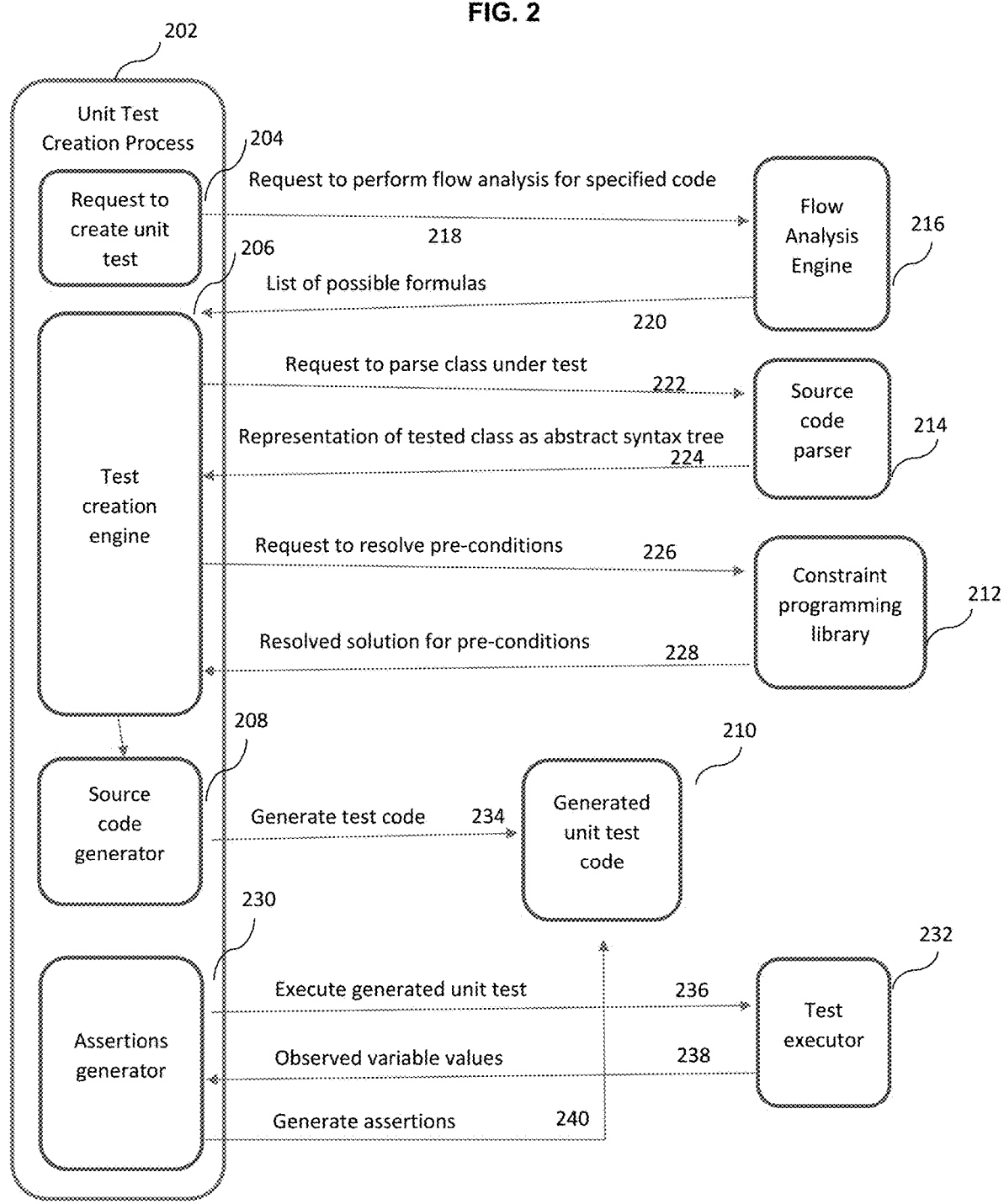
FIG. 2 is a block diagram illustrating the components and the process of a single unit test creation, according to some embodiments of the disclosure.

In some embodiments, the disclosure is directed to a system and method for improved unit test creation. The disclosure is directed to a unit testing solution that automatically creates valuable unit tests and reduces time and effort required to produce them. By combining a range of utilities into a multi-layer process that processes data and makes complex decisions, the disclosure can effectively help organizations optimize their testing efforts.

The ability to analyze a tested code and understand its behavior during execution is the key prerequisite for any solution that attempts to automatically create a unit test. The software application needs to perform code analysis similar to the way a human performs code analysis when designing a unit test. This involves defining a minimal set of conditions that would allow a unit test to successfully execute and verify functionality in a given code. The disclosure's process analyzes a potential flow of code execution to determine a minimal number of variables and pre-conditions associated with them that need to be set up to successfully test the given code.

FIG. 1 shows an example Account class and an example ITransaction interface used by a method in that class. Each instance of the Account object represents a customer's bank account with a specified balance. Multiple transactions that increase or decrease the balance value can be performed on each account. Each transaction incurs a transaction fee except for transactions on accounts whose owner is a student or whose total balance is equal to or greater than a certain amount (the "gold" account).

In this case, a developer must expend time and effort to manually prepare a unit test for the Account class. The code is analyzed and a number of steps are performed to create a test case. In typical scenarios, a Given-When-Then formula is applied, which involves constructing the following sections in the unit test:

"Given"—a set of pre-conditions are stated in the code
"When"—the method under test is called
"Then"—a specific set of expected outcomes are verified
Here is an example of a unit test for the getCustomer( ) method in the Account class:

TABLE 1

```
@Test
public void testGetCustomer( )
   throws Throwable
{
   // Given
   String customer = "Bob Smith";
   int balance = 0;
   Account underTest = new Account(customer, balance);
```

TABLE 1-continued

```
    // When
    String result = underTest.getCustomer( );
    // Then
    assertEquals("Bob Smith", result);
}
```

In this example, the following steps describe the creation of a test case to verify that the behavior of the getCustomer( ) method is correct:
1. Create an instance of the object under test in a predefined state and provide all pre-conditions required for test case execution (the GIVEN section of the test case). This step involves:
   a. Choose the best constructor to correctly construct the object to cover all defined pre-conditions. It may not be true for all cases, but for the given example (FIG. 1) the simpler constructor can be used.
   b. Provide all input parameters required to construct an object that fits the pre-conditions. In the example, the only relevant input parameter is the name of the customer. The input parameter that specifies the balance is not relevant to the behavior of getCustomer( )
   c. Provide all input parameters required to correctly execute the tested method so that all defined pre-conditions are fulfilled. In the example, no additional input parameters are required since getCustomer( ) takes no parameters.
2. Execute the tested method (the WHEN section). The method is called with the input parameters specified in the GIVEN section. In the example, getCustomer( ) method takes no additional parameters and the value returned by the method is stored in a local variable for later use.
3. Verify the expected results (post-conditions) of the method execution (the THEN section). A test case can verify one or more of the following:
   a. The expected result returned from the tested method. In the example, the test case verifies if the name of the customer is the same as the name specified in the pre-conditions.
   b. The expected changes to input parameters passed to the tested method (irrelevant in this example).
   c. The expected changes to the state of the fields in the tested object. In this example, the value of the balance can be verified (optional in this case).

To improve the accuracy and precision of automatically generating test code, the disclosure uses a new solution for "smart unit test creation," using, for example, the Parasoft™ Flow Analysis engine, although one skilled in the art would readily recognize other flow analysis software tools may be used. A flow analysis engine parses a given source code to produce a control-flow graph representation of the methods in a given class, where each method is represented by a directed graph. In the graph, the vertices correspond to the subsequent code instructions and the edges correspond to the possible sequences of instructions. Branching instructions, for example, have multiple outcome edges. The flow analysis engine processes these graphs to build possible execution flow paths and performs symbolic simulation to determine possible values or constraints of variables on each point of every possible execution path.

Until now, the simulations performed by the flow analysis engine were only used during static analysis processes to identify possible code defects. However, according to the disclosure, the flow analysis engine is integrated into the unit test creation process and used to implement one of the most difficult steps in the process, that is, providing information about the minimal set of required pre-conditions provided to the object and/or method under test in order to execute specific code instruction(s). The flow analysis engine identifies constraints on the values of the input parameters and the fields of the tested object that are required for the unit test to cover the given code line(s). That is, to verify if the code behaves as expected.

FIG. 2 is a block diagram illustrating the components and the process of a single unit test creation, according to some embodiments of the disclosure. In some embodiments, each unit test creation process (202) is triggered by a request to create a unit test (204) that specifies the position (line) in the code that the unit test needs to cover. For example, a developer can make a request to create a unit test that covers a specific location in the code. Alternatively, an external process can analyze the entire content of a given class, and make a set of requests to create unit tests that cover all unique blocks of code in the class. The request may be in an electronic form received over a computer network by a computer terminal.

As an example, consider the line "_balance-=transaction.fee( );" in the Account.apply(ITransaction) method from FIG. 1 that charges a fee if certain conditions are met when a transaction is performed. A request (204) to analyze line number 41 in the Account class (the line where the statement occurs in the code) is created and sent (218) to a flow analysis engine (216) for processing. Here is an example request in JSON format that could be sent to the flow analysis engine:

TABLE 2

```
{
    "inputData": [{
        "methodCallStrategy": "enterClassHierarchy",
        "fileName": "...\\src\\main\\java\\bank\\Account.java",
        "entryPointFile": "...\\src\\main\\java\\bank\\Account.java",
        "entryPointMethod": "bank.Account.apply(bank.ITransaction)",
        "lines": [41]
    }]
}
```

Figure 3:
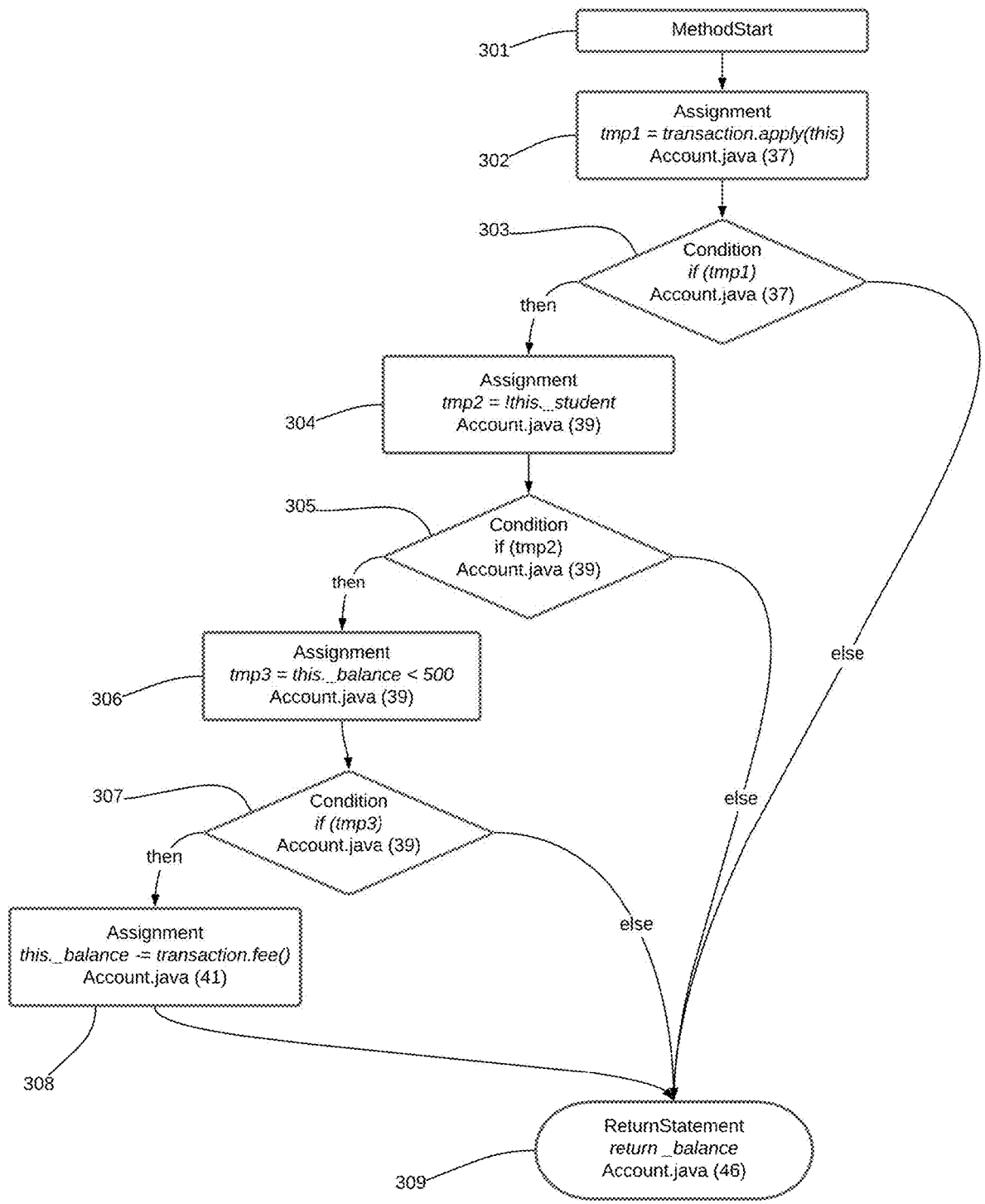
FIG. 3 shows a control flow graph built for an example Account.apply(ITransaction) method by the flow analysis engine, according to some embodiments of the disclosure.

FIG. 3 shows a control flow graph built for an Account.apply(ITransaction) method by the flow analysis engine, according to some embodiments of the disclosure. Each node of the graph represents a single execution instruction, while edges of the graph represent possible transitions between the instructions, building a graph of possible execution paths. In the case of the Accountapply(ITransaction) method, the Control Flow Graph includes the following nodes:
   MethodStart—This is an artificial node added at the beginning of each Control Flow Graph that indicates the beginning of the execution of a given method. It contains information about the method being called, its parameters, etc. (see node 301).
   Assignment—This node represents assigning the result of a given expression (e.g. an operator expression or a method call) to a given variable. It contains information about the variable that is being assigned with a value and the expression that defines a value (see nodes 302, 304, 306, 308).
   Condition—This node represents a branching point in the execution flow where the next element of the execution path is determined by the value of the controlling expression (see nodes 303, 305, 307).

ReturnValue—This node represents the exit point from a method. It contains information about the value returned from a method (see node 309).

In general, control flow graphs may contain additional types of nodes. Also, the control flow graph created for the Accountapply(ITransaction) method contains additional nodes that represent System.out.println( . . . ) method calls, but they are not shown in the example for the sake of clarity as they are irrelevant for the analyzed case. Complex expressions or statements are represented in the control flow graph as multiple subsequent subexpressions with intermediate assignments of the value returned by the subexpression to a temporary variable to reduce the number of possible nodes of the graph and to simplify the algorithms that use the control flow graphs, as illustrated in the following two examples.

Example 1

The conditional statement "if (transaction.apply(this))" from line 37 of the Account class is split into the following nodes:

An assignment node that represents assigning transaction.apply(this) to a temporary variable tmp1 (302).

A condition node that represents condition if (tmp1) (303).

Example 2

The conditional statement if (!_student && (_balance<GOLD_BALANCE_LIMIT)) from line 39 of the Account class is split into the following nodes with appropriate edges between them:

An assignment node that represents assigning the !_student expression to a temporary variable tmp2 (304).

A condition node that represents condition if (tmp2), which corresponds to the first condition of the original complex condition (305).

An assignment node that represents assigning the value of the (_balance<500) expression to a temporary variable tmp3 (306).

A condition node that represents condition if (tmp3), which corresponds to the second condition of the original complex condition (307).

The flow analysis engine builds possible control flow execution paths starting from the MethodStart node (see, e.g., 301 in FIG. 3) and appending subsequently executed instructions. As shown, each time the execution path reaches a branching point and a possible decision outcome is considered, the information about the condition value is stored in the current path's list of pre-conditions. In some embodiments, this information contains data about requirements that need to be fulfilled in order to reach a given branch when executing the code. Expressions that constitute such a pre-condition are evaluated to determine whether the condition is based on the input parameters of the tested method or fields in the tested object like in the considered example: this._student and this._balance.

Additionally, the currently analyzed path is cloned for each possible branch outcome to enable analysis of all possible control flow paths through a method, e.g. in the case of Account.apply(ITransaction) method, the following paths are built and analyzed (numbers correspond to the nodes as shown in FIG. 3):

1. 301-302-303-304-305-306-307-308-309
2. 301-302-303-304-305-306-307-309
3. 301-302-303-304-305-309
4. 301-302-303-309

When the simulation for a control flow execution path reaches the line specified in the request to the flow analysis engine, the current list of pre-conditions is stored to be returned in the response from the flow analysis engine. For example, when building Path #1 for the Account.apply (ITransaction) method shown above, the following list of pre-conditions is built:

"transaction.apply(this)==true", see FIG. 3, node 303

"this._student==false", see FIG. 3, node 305

"this._balance<500", see FIG. 3, node 307

Such a pre-conditions list is included in the response for the line Account.java(41) as it is the only path that contains the Assignment node, see FIG. 3, node 308.

For a given line of code, a flow analysis engine can identify several different lists of pre-conditions, corresponding to different potential execution paths that may lead to the given line. In such a case, all possible lists of pre-conditions are included in the response and the best one is chosen later in the process.

In some embodiments, the process obtains a response, in which each list of pre-conditions represents a unique formula for a simulated execution flow (see Table 3), which includes the following:

variablesUsed—variables that play a role in the simulated flow.

conditions—conditions that need to be set up for the flow to follow the simulated path.

path—line numbers that describe the simulated execution flow.

Here is an example of a possible JSON response that could be returned by the flow analysis engine:

TABLE 3

```
{
  "variablesUsed": [
    "this._balance",
    "this._student",
    "transaction.apply(bank.Account)"
  ],
  "path": [{
    "fileName": " ... \\src\\main\\java\\bank\\Account.java",
    "lines": [ 34, 36, 37, 38, 39, 40, 41, 42, 43, 46 ]
  }],
  "completedData": true,
  "pathStatus": "FINISHED",
  "conditions": [
    "{this._balance}<500",
    "{this._student}==false",
    "{transaction.apply(bank.Account)}==true"
  ]
}
```

In some embodiments, as shown in FIG. 2, a test creation engine 206 analyzes each formula returned by the flow analysis engine to determine whether the process can create a unit test based on the given formula. The test creation engine 206 uses a parsing engine 214 (such as the Eclipse Java™ AST Parser™) to parse the given source code (class) under test (222) to obtain its representation as an abstract syntax tree 224). FIG. 4 shows an example of a partial abstract syntax tree generated for the Account class by a parser, according to some embodiments of the disclosure. Parsing engine 214 parser maps text-based source code to a tree according to syntax rules of the programming language. Such a tree is more convenient than plain text to analyze and to use to modify content programmatically. Each programming language feature has a node representation in AST that fully represents the feature.

For example, the fields declared in the example Account class of FIG. 1 are represented by AST FieldDeclaration nodes (401). Each node contains information that may include the field name, field modifiers, and the declared type of the field. If a field declaration also assigns an initial value, then the node also contains a child node that represents the expression that initializes the field. MethodDeclaration nodes (403) represent methods and constructors that are declared in the source code. These nodes may contain information such as the method name, method modifiers, parameters passed to the method, the class in which the method is declared, the return type of the method, and other relevant details about the method. Each MethodDeclaration node also has a direct child node representing the body of the method. The method body is parsed into a tree of AST nodes that represent statements and expressions. For instance, an Assignment node (404) represents an assignment expression and contains information such as the assignment operator in use and child nodes that correspond to the left-hand expression (405) and right-hand expression (406) of the assignment.

As known in the art, an Abstract Syntax Tree (AST) is a tree representation of the abstract syntactic structure of source code written in a programming language, where each node of the tree denotes a construct occurring in the source code. The syntax is "abstract" in the sense that it does not represent every detail appearing in the real syntax, but rather just the structural or content-related details.

Once the AST is created, the list of formulas returned by the flow analysis engine is filtered and sorted based on criteria that may include:
  number of pre-conditions;
  number of variables used in the pre-conditions; and/or
  complexity of pre-conditions.

The sorting algorithm prefers formulas with the fewest number of pre-conditions and variables to configure. Once the formulas are sorted, the test creation engine (206) iterates over them in order until it finds a formula that it can fully configure as a unit test. In some embodiments, for each selected formula, the test creation engine (206) performs a feasibility analysis using the data contained in the formula (220) and the abstract syntax tree (224). In some embodiments, the feasibility analysis considers the following characteristics for each variable used in the formula:
  If the variable is an internal field of the class under test, can it be configured because it is publicly accessible? In the example Account class, there are no public fields.
  If the variable is an internal field of the class under the test, can it be configured through an input parameter passed to the constructor of the class? In the example Account class, all three fields (_customer, _student, and _balance) can be configured through passing values to a constructor.
  If the variable is an internal field of the class under the test, is there an available setter method that can control (configure) it? In the example Account class, there is no setter method for any of the class fields.
  Can the variable be configured as an input parameter to the tested method? In the Account.apply( ) method, the transaction object is positively identified.

For the example of Table 3 the feasibility analysis processes two pre-conditions: "{this._balance}<500" and "{this._student}==false". For the first condition, the AST tree is searched to find the FieldDeclaration node for the this._balance variable (401). The field declaration contains modifier information that this._balance is a private field (402), which means that it cannot be directly accessed and configured by test code. Next, the AST tree nodes that represent the bodies of all constructors (which are represented as subtrees of MethodDeclaration nodes for constructors (403)) are searched. A search is performed for Assignment nodes whose left-hand expression represents the this._balance field. Such an assignment can be found in line 26 of the example Account class (FIG. 1) and has its representation in AST tree node 404. The right-hand expression of this assignment (406) refers to the "balance" parameter that gets passed into the constructor.

Once an assignment expression is found, the AST tree is searched between the constructor declaration (line 16) and the assignment expression (line 26) to verify whether the "balance" parameter value is modified before it is assigned to the this._balance field. If the "balance" parameter is not modified, the result of this analysis is the information that the this._balance field can be initialized by configuring the "balance" parameter of the Account(String customer, int balance, boolean student) constructor. In the given example, the algorithm determines that initialization can be done by using either of the two constructors defined in the class, since they both accept a "balance" field that is assigned to the this._balance field. Next, using a similar technique the MethodDeclaration nodes that represent the methods in the Account class are analyzed to determine if initialization of this._balance is possible using a setter method. This analysis determines that there are no setter methods in the Account class. A similar procedure is repeated for the other condition "{this._student}==false".

The formula is accepted if all variables from all pre-conditions in it are configurable—meaning that feasibility analysis has determined that the variables could be set using a single constructor, direct field assignment, configuration of a parameter of the method under test, and/or using test setter methods. In this example, both involved variables {this._balance} and {this._student} can be initialized using the same constructor: Account(String customer, int balance, boolean student).

If a formula is accepted, the test creation engine 206 proceeds to the next step. Otherwise, the test creation engine discards the current formula and moves to the next formula from the sorted list used to create a unit test.

The test creation engine then makes a request (226) to a constraint programming library (212) to compute a solution for the pre-conditions for the chosen formula. In the above example, the pre-conditions that need to be solved are the following:
  this._balance<500
  this._student==false
  transaction.apply(bank.Account)==true In some embodiments, the process uses a third-party library for constraint programming (212), for example, Choco-solver library™, which is written in Java™. Such third-party libraries describe combinatorial problems in the form of constraint satisfaction problems and solve them with constraint programming techniques. Constraint programming is a paradigm for solving combinatorial problems that draws on a wide range of techniques from artificial intelligence (AI), computer science, and operations research. To solve a problem, the user must model the problem in a declarative way by stating a set of constraints that need to be satisfied in the solution. The constraints are declared for a set of decision variables. It is assumed that a solution is a single set of decision variable values that fulfills all given constraints.

To build an input for the third-party library for constraint programming, for example, Choco-solver library™, the model defined by an application programming interface (API) is used, which represents prerequisite constraints and decision variables. Pre-conditions from the formula are parsed and translated into library constraint objects. In some embodiments, the following categories of constraints are used:

Arithmetic constraints that are defined with an arithmetic expression.
Logical constraints that are defined with explicit semantics.
Extensional constraints that are defined by enumerating a set of values that would satisfy them.

Source code variables, fields, and expressions from the flow analysis pre-conditions are translated into decision variables and constraints. In some embodiments, for the given example three decision variables are created:
this._balance
this._student
transaction.apply(bank.Account)
and three constraints are created for them:
this._balance<500
this._student is FALSE
transaction.apply(bank.Account) is TRUE.

Additionally, a range where the third-party library (e.g., Choco-solver™) tries to find the final solution may be configured for each variable. In this example, a default range for integer type (from −1000 to 1000) will be configured for the this._balance variable.

In some embodiments, an additional policy that defines the most preferable of the expected solutions is specified. This is done to find the solution that best fits the analyzed case and that can be most readily understood by developers when incorporated into a generated test case. In most cases, the solution where the proposed values are closest to the bounds specified in the pre-conditions is preferable. For example, the preferable solution for this._balance could be the maximum possible value from the specified range.

When successful, the constraint programming library (212) returns a solution (228) that specifies a set of exact values that satisfy the pre-conditions for all variables in the formula that need to be configured. The solution is a set of arithmetic or boolean values (one value for every defined decision variable). For example, the following solution may be chosen for the example above:
this._balance=499
this._student=false
transaction.apply(bank.Account) returns true If the constraint programming library returns a solution to the pre-conditions for the current formula, the test creation engine (206) sends the formula and the solution for the pre-conditions to the source code generator (208) to generate the unit test. This formula will result in creation of the simplest possible unit test that covers the code specified in the request to create a unit test. Otherwise, the test creation engine discards the current formula and begins analysis of the next formula from the sorted list of formulas received from the flow analysis engine.

Subsequently, the disclosure generates source code (210) based on the chosen formula and the solution for the formula's pre-conditions (234), as illustrated in Table 4 below.

TABLE 4

```
@Test
public void testApply( )
    throws Throwable
{
    // Given
    String customer = ""; // default value
    int balance = 499; // provided value
    boolean student = false; // provided value
    Account underTest = new Account(customer, balance, student);
    // When
    ITransaction transaction = mock(ITransaction.class);
    boolean applyResult = true; // provided value
    when(transaction.apply(nullable(Account.class))).thenReturn(applyResult);
    int result = underTest.apply(transaction);
}
```

As shown in Table 4, a GIVEN section is created where an instance of the object under test is created using the selected constructor, passing values to the constructor that match those in the solution to the pre-conditions. In the above example, an Account object is created by passing the customer, balance, and student parameters to the constructor. Some values passed to the constructor may use default values (such as "false", "0", or " " (empty string)) because they are not included in the pre-conditions for the chosen formula.

A WHEN section is then constructed where the method under test is called with its necessary input parameters, again using values that match those in the solution to the pre-conditions. In the above example, an ITransaction object instance is created and configured so that the ITranaction-.apply(bank.Account) method will return true when it is called. To achieve this, the process uses the Mockito framework, which constructs mock object models that simulate interactions with the real object. The Mockito library (a database) is used to construct the call to the tested method and configure the result of its execution. The Mockito framework is a unit testing framework for Java™ that allows the creation of "test double" objects (mock objects) in automated unit tests for the purpose of Test-driven Development (TDD) or Behavior Driven Development (BDD).

In some embodiments, the unit test creation process utilizes an assertions generator (230) to create assertions within the generated unit test (210). The assertions generator executes the generated unit test (236) using a test executor (232) that is configured to observe the behavior of the code under test to identify the runtime values for variables within the tested code that can be verified by the unit test. For example, the text executor may observe a specific value returned by the method under test, since it is common for unit tests to assert on any values returned by the method under test.

In some embodiments, the test executor (232) may observe the values for any variables defined as fields within the class under test, since it is common to assert on the values of fields in the class under test after the method under test is performed. In some embodiments, the test executor executes tests written in the Java™ programming language and observes the behavior of the code under test using a Java™ agent that is attached to the test execution process.

The assertion generator retrieves the observed runtime variable values from the test executor 238. Using the values observed during execution of the unit test, the assertions generator generates assertions (240) within the unit test, as shown in the THEN section of Table 5 below.

TABLE 5

```
@Test
public void testApply( )
    throws Throwable
{
    // Given
    String customer = ""; // default value
    int balance = 499; // provided value
    boolean student = false; // provided value
    Account underTest = new Account(customer, balance, student);
    // When
    ITransaction transaction = mock(ITransaction.class);
    boolean applyResult = true; // provided value
    when(transaction.apply(nullable(Account.class))).thenReturn(applyResult);
    int result = underTest.apply(transaction);
    // Then
    assertEquals(499, result);
}
```

As shown in Table 5, an assertion was added to the unit test in a THEN section of the test. The assertion "assertEquals(499, result)" was added to validate the result of calling the apply method. Additional assertions to validate the value of the _balance, _customer, and _student fields within the Account class could also have been added to the unit test but were not added in this example.

Using the described process, the disclosure automatically creates a unit test that is the simplest possible unit test that could have been created to fulfil the request to cover line number 41. The test is constructed and organized in a way that makes it human-readable and easy to understand. Additionally, the content may be decorated with comments that indicate the variables whose values are crucial for the test to correctly cover the specified code (// provided value) and variables that don't play a role in covering the given case (// default value).

In some embodiments, each unit test creation process starts with a request that specifies the position in the code that the unit test needs to cover. The request is then transformed into a JSON format and sent to a flow analysis engine for processing. The flow analysis engine constructs a Control Flow Graph (CFG) representation for the given source code. Utilizing the CFG, the flow analysis engine identifies several different potential execution paths (formulas) that may lead to the place in the code that the unit test needs to cover. The resulting list of formulas is then returned as a response to the unit test creation process.

The unit test creation process uses a test creation engine to analyze each formula in the list of formulas returned from a flow analysis engine. The formulas are filtered and sorted based on several criteria to obtain a list beginning with formulas that contain the fewest number of pre-conditions and variables to configure. Next, the test creation engine iterates over them in order until it finds a formula that it can fully configure as a unit test.

A source code parser is invoked to parse the given source code under test, which results in a representation of the code as an abstract syntax tree. Next a feasibility analysis is performed using the data contained in the formula and the abstract syntax tree. The feasibility analysis considers variables used in the formula to assess the feasibility of configuring them for a unit test. If all variables in a formula are assessed to be configurable, the pre-conditions from the formula are translated into decision variables and a set of values that satisfies the pre-conditions is computed for those variables. In some embodiments, the computation is performed using a library for constraint programming that creates a possible solution that matches the pre-conditions, with assigned arithmetic or boolean values for all variables. Finally, the formula is sent to the source code generator to generate source code for the unit test, based on the chosen formula and the solution for the formula's pre-conditions.

An assertions generator is used to create assertions within the generated unit test. It executes the generated unit test using a test executor. The executor uses a Java™ agent that is attached to the test execution process to observe the behavior of the code under the test and to identify the runtime values for variables. The assertions generator retrieves the observed runtime variable values and using them it generates assertions within the unit test.

FIG. 5 depicts an exemplary process flow for unit test creation to test a computer program, according to some embodiments of the disclosure. The method may be executed by one or more processor, or stored on a tangible computer readable memory to be executed by one or more processor. As shown in block 502, an electronic request that specifies a portion in the computer program to be covered by the unit test is received over a computer network. For example, a developer can make a request to create a unit test, or an external process can make a request to create unit tests that cover unique blocks of code in the class. In block 504, a Control Flow Graph (CFG) representation for the portion in the computer program is constructed, for example, by a flow analysis engine.

In block 506, the CFG is used to identify a plurality of different potential execution paths that may lead to the portion in the computer program and to identify a plurality of different formulas, corresponding to the plurality of different potential execution paths. Each formula includes a list of pre-conditions and associated variables that represent a simulated execution flow. The simulated execution path may include variables that play a role in the simulated path, conditions that need to be set up for the flow to follow the simulated path, and line numbers that describe the simulated execution flow. In block 508, the source code of the (portion in the) computer program is parsed to generate an abstract syntax tree as representation of a content of the portion in the computer program.

The (portion in the) computer program is analyzed to determine whether it provides capability to set each of the associated variables in each formula, utilizing the abstract syntax tree, in block 510. In block 512, variables, fields, and expressions of the source code represented in each formula are translated into a plurality of decision variables, using pre-determined categories of constraints. In some embodiments, arithmetic constraints that are defined with an arithmetic expression; logical constraints that are defined with explicit semantics; and/or extensional constraints that are defined by enumerating a set of values that would satisfy them are used as categories of constraints.

In block 514, a solution to the list of pre-conditions from each formula is computed to one of the potential solutions that specifies values for decision variables. In some embodiments, a third-party library that describes combinatorial problems in the form of constraint satisfaction problems and solves them with constraint programming techniques is used to compute the solution. In block 516, a formula with a fewest number of associated variables, which has a solution that specifies values for decision variables for given pre-conditions is selected, and a unit test is created based on the data and the list of pre-conditions collected and solved, in block 518.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims, tables and drawings.

The invention claimed is:

1. A method, executed by one or more processors, for creating unit tests for testing a computer program, the method comprising:
receiving, over a computer network, an electronic request that specifies a portion in the computer program to be covered by the unit test;
constructing a Control Flow Graph (CFG) representation for the portion in the computer program, wherein the CFG includes at least an assignment node for assigning a method call executed by a flow analysis software to a given variable and information about the given variable that is being assigned with a value, and a return value node representing an exit point from a method called by the flow analysis software;
parsing the CFG by the flow analysis software to build a plurality of different potential execution paths that may lead to the portion in the computer program and to identify a unique formula for each of the potential execution paths wherein each formula includes a list of pre-conditions and associated variables that represent a simulated execution path;
parsing a source code of the portion in the computer program, by the one or more processors, to generate an abstract syntax tree as representation of a content of the portion in the computer program, by mapping a source code of the portion to a tree according to syntax rules of a programming language;
analyzing the portion in the computer program to determine whether it provides capability to set each of the associated variables in each formula, utilizing the abstract syntax tree;
translating variables, fields, and expressions of the source code represented in the each formula into a plurality of decision variables, using pre-determined categories of constraints;
computing a solution to the list of pre-conditions from the each formula to one of the potential solutions that specifies values for decision variables;
selecting a formula, from the plurality of formulas, with fewest number of associated variables, which has a solution that specifies values for decision variables for given pre-conditions;
creating a unit test, based on the solution and the list of pre-conditions collected and solved; and
executing the unit test to test the computer program.

2. The method of claim 1, wherein computing a solution to the list of pre-conditions from the formula is performed using a library of software for constraint programming.

3. The method of claim 2, wherein the library of software for constraint programming describes combinatorial problems in the form of constraint satisfaction problems and solves them with constraint programming techniques.

4. The method of claim 2, wherein the library of software for constraint programming returns a solution that specifies a set of exact values that satisfy pre-conditions for all variables in the selected formula to be configured.

5. The method of claim 1, further comprising verifying characteristics for each variable used in the selected formula to determine whether the portion in the computer program provides capability to set each of the associated variables, wherein the characteristics include one or more of:
whether the variable is an internal field of the class under test and can be configured as an input parameter passed to a constructor for the class,
whether the variable is an internal field of the class under test and can be configured using an available setter method,
whether the variable is an internal field of the class under test and can be configured because it is publicly accessible, and
whether the variable can be configured as an input parameter to the tested portion.

6. The method of claim 1, wherein each node of the CFG represents a single execution instruction, and edges of the CFG represent possible transitions between the instructions.

7. The method of claim 1, wherein the determining whether the portion in the computer program provides capability to set each of the associated variables is positive when all variables from all conditions in the formula are configurable using a single constructor, direct assignments, parameters of method under the test or setter methods.

8. The method of claim 1, further comprising observing behavior of the computer program to identify runtime values for variables in the portion of the computer program; and generating assertions within the unit test using the runtime values for variables.

9. A system for creating unit tests for testing a computer program comprising:
a memory; and
one or more processors configured to:
construct a Control Flow Graph (CFG) representation for the computer program, wherein the CFG includes at least an assignment node for assigning a method call executed by a flow analysis software to a given variable and information about the given variable that is being assigned with a value, and a return value node representing an exit point from a method called by the flow analysis software;
parse the CFG to build a plurality of different potential execution paths within the computer program and to identify a unique formula for each of the potential execution paths, wherein each formula includes a list of pre-conditions and associated variables that represent a simulated execution path;
parse a source code of the computer program to generate an abstract syntax tree as representation of a content of the computer program, by mapping a source code of the portion to a tree according to syntax rules of a programming language;
analyze the computer program to determine whether it provides capability to set each of the associated variables in each formula utilizing the abstract syntax tree, wherein the one or more processors translate variables, fields, and expressions of the source code represented in the each formula into a plurality of decision variables, using pre-determined categories of constraints;
compute a solution to the list of pre-conditions from the each formula to one of the potential solutions that specifies values for decision variables, wherein the one or more processors select a formula, from the plurality of formulas, with a fewest number of associated variables, which has a solution that specifies values for decision variables for given pre-conditions, and creates a unit test, based on the solution and the list of pre-conditions collected and solved; and
execute the unit test to test the computer program.

10. The system of claim 9, wherein a library of software for constraint programming describes combinatorial problems in the form of constraint satisfaction problems and solves them with constraint programming techniques.

11. The system of claim 10, wherein the library of software for constraint programming returns a solution that specifies a set of exact values that satisfy pre-conditions for all variables in the selected formula to be configured.

12. The system of claim 9, wherein the one or more processors verify verifies characteristics for each variable used in the selected formula to determine whether the computer program provides capability to set each of the associated variables, wherein the characteristics include one or more of:
whether the variable is an internal field of the class under test and can be configured as an input parameter passed to a constructor for the class,
whether the variable is an internal field of the class under test and can be configured using an available setter method,
whether the variable is an internal field of the class under test and can be configured because it is publicly accessible, and
whether the variable can be configured as an input parameter to the tested portion.

13. The system of claim 9, wherein each node of the CFG represents a single execution instruction, and edges of the CFG represent possible transitions between the instructions.

14. The system of claim 9, wherein the determining whether the computer program provides capability to set each of the associated variables is positive when all variables from all conditions in the formula are configurable using a single constructor, direct assignments, parameters of method under the test or setter methods.

15. The system of claim 9, wherein the one or more processors observe behavior of the computer program to identify runtime values for variables in the computer program; and generates assertions within the unit test using the runtime values for variables.

16. A tangible computer readable memory storing a plurality of computer instructions, the instructions when executed by one or more processor perform a method for creating unit tests for testing a computer program, the method comprising:
receiving, over a computer network, an electronic request that specifies a portion in the computer program to be covered by the unit test;
constructing a Control Flow Graph (CFG) representation for the portion in the computer program, wherein the CFG includes at least an assignment node for assigning a method call executed by a flow analysis software to a given variable and information about the given variable that is being assigned with a value, and a return value node representing an exit point from a method called by the flow analysis software;
parsing the CFG by the flow analysis software to build a plurality of different potential execution paths that may lead to the portion in the computer program and to identify a unique formula for each of the potential execution paths, wherein each formula includes a list of pre-conditions and associated variables that represent a simulated execution path;
parsing a source code of the portion in the computer program, by the one or more processors, to generate an abstract syntax tree as representation of a content of the portion in the computer program, by mapping a source code of the portion to a tree according to syntax rules of a programming language;
analyzing the portion in the computer program to determine whether it provides capability to set each of the associated variables in each formula, utilizing the abstract syntax tree;
translating variables, fields, and expressions of the source code represented in the each formula into a plurality of decision variables, using pre-determined categories of constraints;
computing a solution to the list of pre-conditions from the each formula to one of the potential solutions that specifies values for decision variables;
selecting a formula, from the plurality of formulas, with fewest number of associated variables, which has a solution that specifies values for decision variables for given pre-conditions;
creating a unit test, based on the solution and the list of pre-conditions collected and solved; and
executing the unit test to test the computer program.

17. The tangible computer readable memory of claim 16, wherein computing a solution to the list of pre-conditions from the formula is performed using a library of software for constraint programming.

18. The tangible computer readable memory of claim 16, further comprising computer instructions for verifying characteristics for each variable used in the selected formula to determine whether the portion in the computer program provides capability to set each of the associated variables, wherein the characteristics include one or more of:

whether the variable is an internal field of the class under test and can be configured as an input parameter passed to a constructor for the class, whether the variable is an internal field of the class under test and can be configured using an available setter method, whether the variable is an internal field of the class under test and can be configured because it is publicly accessible, and whether the variable can be configured as an input parameter to the tested portion.

\* \* \* \* \*

UNITED STATES PATENT AND TRADEMARK OFFICE
CERTIFICATE OF CORRECTION

| | |
|---|---|
| PATENT NO. | : 11,921,621 B2 |
| APPLICATION NO. | : 17/459240 |
| DATED | : March 5, 2024 |
| INVENTOR(S) | : Maciej Glowa et al. |

It is certified that error appears in the above-identified patent and that said Letters Patent is hereby corrected as shown below:

In the Specification

In Column 1, Line 7, delete "Applications" and insert -- Application --.

In the Claims

In Column 15, Line 65, in Claim 1, delete "paths" and insert -- paths, --.

In Column 17, Line 27, in Claim 9, delete "formula" and insert -- formula, --.

Signed and Sealed this
Fourth Day of June, 2024

Katherine Kelly Vidal
*Director of the United States Patent and Trademark Office*